United States Patent [19]

Reneau

[11] 4,293,874
[45] Oct. 6, 1981

[54] DC RESTORATION CIRCUIT FOR TELEVISION RECEIVER

[75] Inventor: Daniel L. Reneau, Elmhurst, Ill.

[73] Assignee: Zenith Radio Corporation, Glenview, Ill.

[21] Appl. No.: 118,127

[22] Filed: Feb. 4, 1980

[51] Int. Cl.³ .............................................. H04N 5/18
[52] U.S. Cl. .................................... 358/172; 358/171; 358/34
[58] Field of Search ........................... 358/171, 172, 34

[56] References Cited

U.S. PATENT DOCUMENTS 3,582,545  6/1971  Thorpe ................................ 358/171
3,985,954  10/1976  Kuniyoshi et al. .................. 358/171

Primary Examiner—Richard Murray

[57] ABSTRACT

A DC restoration circuit for an AC coupled television receiver includes means for converting an input video voltage signal to a corresponding video current signal and for abstracting from the video current signal a DC current feedback signal, the remaining video current signal being reconverted to a corresponding output video voltage having a DC voltage component. A feedback loop including a clamp capacitor is operable during the back porch of the horizontal blanking interval for establishing the level of the DC current feedback signal to equalize the values of the DC component of the output video voltage and a black level reference voltage derived from a manually operable brightness control.

13 Claims, 1 Drawing Figure

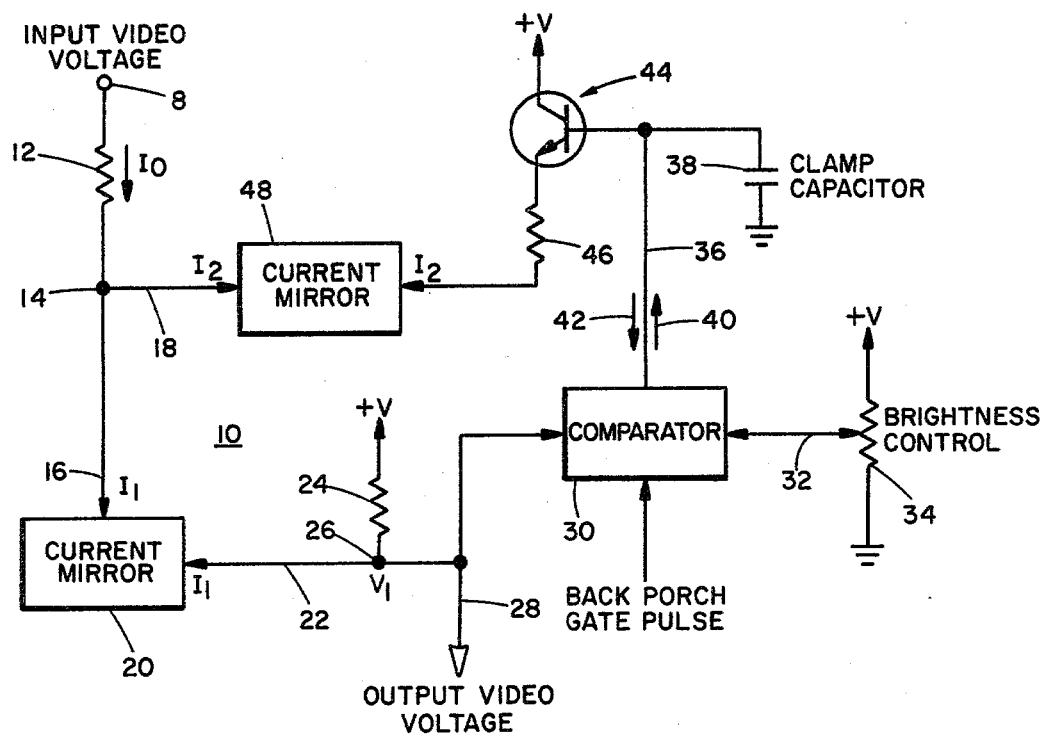

DC RESTORATION CIRCUIT FOR TELEVISION RECEIVER

BACKGROUND OF THE INVENTION

The present invention relates to DC restoration circuits used in television receivers and, more particularly, to a DC restoration circuit employing current-mode feedback techniques to restore the DC level of a received television signal.

The video component of a transmitted television signal is characterized by a DC level establishing or defining the average background brightness of a scanned scene. In order for the reproduced picture at the receiver to have the proper background brightness, i.e. the proper level with respect to black, the transmitted DC component must be retained or otherwise restored in the receiver. In television receivers employing direct coupling techniques throughout the entire video section, the DC component of the composite video signal is inherently retained in the receiver and no special circuits are necessary to insure the reproduction of a picture having a proper average background brightness level. However, for purposes of simplicity and economy, as well as to prevent the accumulation of system errors, most current television receivers have video sections incorporating RC coupling circuits. As a result of the DC blocking action of the coupling capacitors in these circuits, the background brightness determining component of the video signal undergoes rather radical level shifts and must therefore be suitably restored in the receiver to enable reproduction of an acceptable picture.

Typically, the DC component of the video signal in an AC coupled video section is restored to establish a suitable average background brightness level in response to a manually operable brightness control which is used in association with a clamping capacitor to set the picture tube grid bias voltage. More specifically, the brightness control is used to establish an adjustable reference potential, a predetermined portion of the horizontal blanking interval of the video signal, e.g. the back porch interval, being clamped to the reference potential by the clamp capacitor to establish a desired black level. Thus, in response to adjusting the brightness control, the viewer effectively controls the black level, and thereby the average background brightness, of the reproduced picture by restoring the DC component of the video signal to a proper level. In this regard, while the back porch, as well as the front porch, of the horizontal blanking interval does not precisely correspond to black level as defined by FCC standards, the difference therebetween is considered to have only a negligible effect on DC restoration circuits of the foregoing type.

An embodiment of a DC restoration circuit employing the above principles is illustrated in an article entitled "A Versatile Low-Level Luminance IC for TV" appearing on pages 169-175 of the August, 1978 issue of IEEE Transactions on Consumer Electronics, Vol. CE-24, No. 3. In the illustrated circuit, the unblanked luminance component of the video signal is coupled to one input of a comparator while the second input to the comparator consists of a DC reference voltage derived from a manually adjustable brightness control. A back porch gate pulse enables the comparator for directing current flow into or out of a clamp capacitor which sets the DC voltage levels in a feedback loop for adjusting the black level of the luminance signal until a condition of equality between the DC reference voltage and the level of the back porch is established. While this circuit is adequate in certain applications, its operation is characterized by a rather limited dynamic range rendering the circuit unsuitable for use with different types of television receivers. The limited dynamic range characterizing the circuit is primarily attributable to the fact that the feedback loop is used to couple voltage signals for controlling system operation.

It is therefore a primary object of the present invention to provide a new and improved DC restoration circuit capable of widespread application and exhibiting a rather large dynamic range. As explained in detail hereinafter, these objects are achieved through the provision of a novel bi-directional gated back porch clamp circuit utilizing current-mode feedback techniques for controlling the black level of the luminance component of a composite video signal.

BRIEF DESCRIPTION OF THE DRAWING

The sole FIGURE accompanying the specification illustrates, in block diagram form, a preferred embodiment of the DC restoration circuit of the present invention.

DESCRIPTION OF THE PREFERRED EMBODIMENT

Referring to the FIGURE, an input video voltage signal, such as would be developed at the output of the video detector of a conventional monochrome or color television receiver, is developed at the input terminal 8 of a DC restoration circuit indicated generally by reference numeral 10. As discussed previously, in an AC coupled television receiver, the DC level of the video voltage signal, which determines the average background brightness of the televised scene, undergoes some rather radical level shifts as the video signal is propogated through the signal processing circuits of the receiver. If steps are not taken to somehow compensate for these level shifts, the reproduced scene will have an average background brightness which, not only does not correspond to the televised scene, but also results in a picture which is most displeasing to the viewer. The DC restoration circuit 10 is designed for re-establishing a suitable DC level in the processed video voltage signal so as to maintain a desired average background brightness in the reproduced scene.

Returning to the FIGURE, the input video voltage signal developed at the input terminal 8, whose DC level may be either too high or too low as a result of the effect of previous AC coupled stages in the receiver, is coupled through a resistor 12 which converts the input video voltage to a corresponding current $I_0$ having a DC current component. The current $I_0$ is divided at a node 14 into a signal current $I_1$ flowing in a conductor 16 and a DC current feedback signal $I_2$ flowing in a conductor 18. It will thus be recognized that the DC component of the signal current $I_1$ flowing in conductor 16 corresponds to the difference between the DC component of the video current signal $I_0$ and the DC current feedback signal.

The conductor 16 carrying the signal current $I_1$ forms an input to a current mirror 20 which develops a corresponding current $I_1$ on a conductor 22 coupled through a resistor 24 to a source of positive potential $+V$. As a result, the node 26 formed between the resistor 24 and the conductor 22 is characterized by a voltage $V_1$ which is given by the expression $V_1 = V - I_1 R$, where R represents the resistance of resistor 24. The voltage $V_1$ developed at the node 26 constitutes the output video voltage of the DC restoration circuit 10 and is coupled to the following circuitry of the television receiver by an output conductor 28. As will be explained in further detail hereinafter, the DC level of the output video voltage $V_1$ will be suitably adjusted relative to the DC level of the input video voltage developed at the input terminal 10 through the operation of the DC restoration circuit 10.

The output video voltage $V_1$ developed at the node 26 is also coupled to one input of a charge pump comparator circuit 30 connected in a feedback loop between the nodes 14 and 26. A second input to the charge pump comparator circuit 30 is a black level reference voltage derived from the slider 32 of a manually operable brightness control potentiometer 34 connected between a source of positive potential +V and ground potential. The charge pump comparator circuit 30, which is enabled for operation by a gate pulse coinciding with the back porch of the horizontal blanking interval, includes a bi-directional output conductor 36 connected to one plate of a clamping capacitor 38, the other plate of the capacitor 38 being connected to a source of ground potential. When enabled by a back porch gating pulse, the charge pump comparator circuit 30 is operable for charging the clamp capacitor 38 by establishing a flow of current in the output conductor 36 in the direction of arrow 40 in response to the black level reference voltage exceeding the DC component of the output video voltage $V_1$. On the other hand, the enabled charge pump comparator 30 will establish a flow of current in the output conductor 36 in the direction of arrow 42 for discharging the clamp capacitor 38 in response to the DC component of the output video voltage $V_1$ exceeding the black level reference voltage. In this regard, it will be appreciated that since the charge pump comparator 30 is enabled for operation only during the back porch of the horizontal blanking interval, the comparisons effected thereby will represent the relative values of the black level reference voltage and the back porch of the horizontal blanking interval of the output video voltage $V_1$.

The ungrounded plate of the clamp capacitor 38 is connected to the base terminal of an npn transistor 44 which acts as a buffer to prevent rapid discharge of the clamp capacitor. The collector terminal of the transistor 44 is connected to a source of positive potential +V while the transistor's emitter terminal is connected to a resistor 46 developing an adjustment current signal directly related to the voltage developed across the clamp capacitor 38. The adjustment current signal developed by the resistor 46 is supplied to one terminal of a second current mirror 48, the current mirror 48 causing the DC current feedback signal flowing in conductor 18 to assume a corresponding or proportional value.

In general terms, the DC restoration circuit 10 is operable for adjusting the output video voltage $V_1$ through corresponding adjustments in the DC current feedback signal. That is, the value of the DC current feedback signal, which is determined by the adjustment signal current which, in turn, is established by the relative values of the black level reference voltage and the DC component of the output video voltage during the back porch of the horizontal blanking interval, determines the magnitude of the signal current $I_1$ flowing in the conductor 16. The signal current $I_1$, in turn, determines the magnitude of the DC component of the output video voltage $V_1$. A desired DC level for the output video voltage is established by controlling the adjustment signal current in response to a selected black level reference voltage.

More particularly, assume that the brightness control potentiometer 34 has been set by the viewer for providing a selected black level reference voltage. As will be seen hereinafter, the effect of the DC restoration circuit 10 is to equalize the values of the selected black level reference voltage and the back porch of the horizontal blanking interval of the output video voltage $V_1$. Now, assume that the DC level of the input video voltage developed at terminal 8 decreases to a value below that at which the circuit 10 was previously equalized. As a result of this decreased DC level, the current $I_0$ flowing through resistor 12 correspondingly decreases as does the signal current $I_1$ flowing in conductor 16. The mirrored current $I_1$ flowing in conductor 22 consequently also decreases in value causing the output video voltage $V_1$ to correspondingly increase in value. Since the level of the back porch of the horizontal blanking interval of the output video voltage $V_1$ now exceeds the black level reference voltage, the charge pump comparator circuit 30 establishes an output current in the direction of arrow 42 for discharging the clamp capacitor during the back porch interval. The decreased voltage across the capacitor 38 causes the transistor 44 to conduct less heavily reducing the adjustment signal current flowing through the resistor 46. The mirrored DC current feedback signal flowing in conductor 18 is therefore also reduced causing the DC component of the signal current $I_1$ to proportionately increase. The mirrored current $I_1$ consequently also increases reducing the output video voltage $V_1$ to a point where equalization with the black level reference voltage is again achieved.

Next, assume that the DC level of the input video voltage increases to a value above that at which the circuit was equalized. In this case, the current $I_0$ flowing through resistor 12 correspondingly increases causing the signal current $I_1$ to likewise increase. The increased mirrored current $I_1$ reduces the output video voltage $V_1$ causing the charge pump comparator circuit 30 to establish an output current flow in the direction of arrow 40 for charging the clamp capacitor 38. The increased voltage across the capacitor 38 causes the transistor 44 to conduct more heavily increasing the adjustment signal current flowing through the resistor 46. The increased adjustment signal current flowing in conductor 18 reduces the DC component of the signal current $I_1$ and thereby increases the DC component of the output video voltage $V_1$ to a point where equalization with the black level reference voltage is again achieved.

It will thus be seen that the DC restoration circuit 10 advantageously utilizes current-mode feedback techniques for equalizing the values of the back porch of the horizontal blanking interval of an input video signal and an adjustable black level reference signal. Adjustments in the black level reference signal control the average background brightness of the reproduced scene which may be set in accordance with the preferences of the viewer. Also, quite advantageously, a relatively wide dynamic range is achieved since the input current flowing through resistor 12 may vary considerably.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

What is claimed is:

1. In a television receiver of the type having means for developing a DC black level reference voltage and means for developing a transmitted video voltage signal with a DC voltage component, an improved black level clamp circuit comprising:
    means for converting said video voltage signal to a corresponding video current signal with a DC current component;
    means for abstracting from said video current signal a DC current feedback signal representing a fraction of said DC current component of said video current signal;
    means for reconverting said video current signal to a corresponding output video voltage signal; and
    gating means operable during a constant level portion of the horizontal blanking interval of said video voltage signal for directly adjusting said DC current feedback signal to equalize the values of said black level reference voltage and the DC component of said output video voltage signal.

2. A black level clamp circuit according to claim 1 wherein said gating means comprises:
    a clamp capacitor;
    bi-directional means for charging and discharging said clamp capacitor during said horizontal interval blanking portion according to the relative values of said black level reference voltage and said DC component of said output video voltage signal; and
    means responsive to the charge accumulated by said clamp capacitor for adjusting the value of said DC current feedback signal.

3. A black level clamp circuit according to claim 2 wherein said means for charging and discharging comprises charge pump comparator means for developing an output current charging said clamp capacitor in response to said black level reference voltage exceeding said DC component of said output video voltage signal during said horizontal interval blanking portion and discharging said clamp capacitor in response to said DC component of said output video voltage signal exceeding said black level reference voltage during said horizontal interval blanking portion.

4. A black level clamp circuit according to claim 3 wherein said means for adjusting comprises means for developing an adjustment current signal having a value directly related to the charge accumulated by said clamp capacitor and means for establishing said DC current feedback signal at a level proportional to said adjustment current signal.

5. A black level clamp circuit according to claim 4 wherein said means for establishing comprises first current mirror means having a first terminal receiving said adjustment current signal and a second terminal connected for developing said DC current feedback signal.

6. A black level clamp circuit according to claim 1 wherein said means for reconverting comprises second current mirror means having a first terminal receiving said video current signal and a second terminal developing a corresponding current signal and resistive means connected to said second terminal for developing said output video voltage signal.

7. In a television receiver of the type having means for developing a voltage representing a transmitted video signal having a DC component, an improved black level clamp circuit comprising:
    means for converting said video voltage signal to a corresponding video current signal having a DC current component;
    viewer operable means for generating a black level reference voltage;
    means coupled to said converting means for reconverting said video current signal to a corresponding output video voltage signal having a DC voltage component; and
    feedback means connected between said converting and reconverting means and operable during a constant level portion of the horizontal blanking interval of said video voltage signal for adjusting the DC component of the current coupled to said reconverting means (without affecting said video voltage signal) for equalizing the values of said black level reference voltage and said DC component of said output video voltage signal.

8. A black level clamp circuit according to claim 7 wherein said feedback means comprises:
    a clamp capacitor;
    bi-directional means for charging and discharging said clamp capacitor during the back porch of said horizontal blanking interval according to the relative values of said black level reference voltage and said DC component of said output video voltage signal;
    means responsive to the charge accumulated on said clamp capacitor for developing an adjustment current signal directly related thereto; and
    means for reducing said DC component of said video current signal in accordance with said adjustment current signal for forming the DC component of said video current signal coupled to said reconverting means.

9. A black level clamp circuit according to claim 8 wherein said means for charging and discharging comprises means for developing a gating signal defining the back porch of said horizontal blanking interval and charge pump comparator means responsive to said gating signal for developing an output current charging said clamp capacitor in response to said black level reference voltage exceeding said DC component of said output video voltage signal during said back porch interval and discharging said clamp capacitor in response to said DC component of said output video voltage signal exceeding said black level reference voltage during said back porch interval.

10. A black level clamp circuit according to claim 9 wherein said means for reducing comprises means for directly abstracting a DC current feedback signal proportional to said adjustment current signal from the DC component of said video current signal.

11. A black level clamp circuit according to claim 7 wherein said means for converting comprises current mirror means having a first terminal receiving said video current signal and a second terminal developing a corresponding current signal and resistive means connected to said second terminal for developing said output video voltage signal.

12. A method for establishing the DC component of an output video voltage signal during a constant level portion of the horizontal blanking interval of a received video voltage signal comprising the steps of:

converting the received video voltage signal to a corresponding video current signal having a DC current component;

defining a selected black level reference voltage;

reconverting a portion of said video current signal to a corresponding output video voltage signal, said output video voltage signal having a DC component; and adjusting the level of said portion of said video current signal independently of said video voltage signal during said horizontal blanking interval portion for equalizing the values of said black level reference voltage and said DC component of said output video voltage signal.

13. The method of claim 12 wherein said adjusting step comprises the steps of:

comparing said DC component of said output video voltage signal to said black level reference voltage;

bi-directionally charging and discharging a clamp capacitor according to the results of said comparison step;

directly developing a DC current feedback signal proportional to the charge accumulated by said clamp capacitor; and subtracting said DC current feedback signal from said DC current component of said video current signal for forming said portion thereof.

* * * * *